Sept. 2, 1924.

W. JANNELL

COMMUTATOR SLOTTING MACHINE

Filed Dec. 3, 1920    4 Sheets-Sheet 1

INVENTOR
Wm Jannell,
BY Baker & Macklin,
ATTORNEYS

Sept. 2, 1924.
W. JANNELL
COMMUTATOR SLOTTING MACHINE
Filed Dec. 3, 1920 4 Sheets-Sheet 4
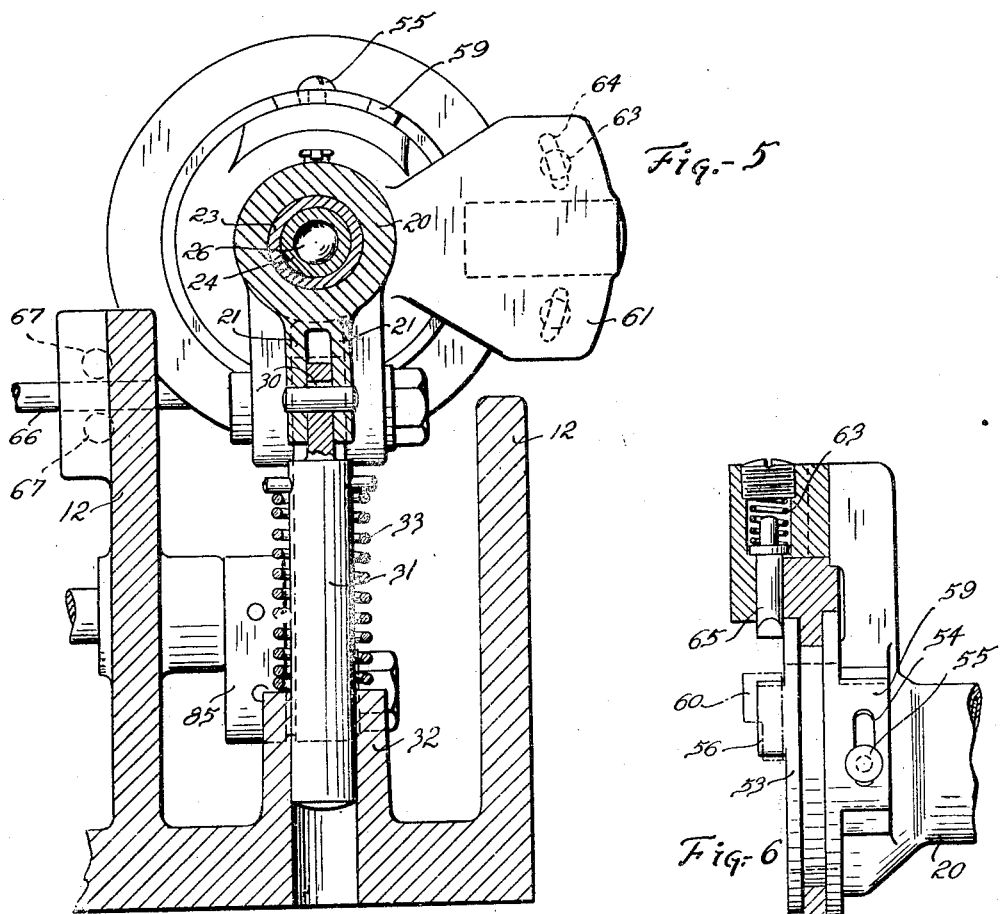
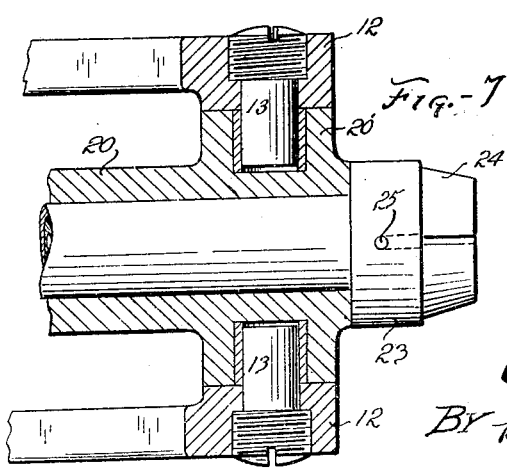
INVENTOR
Wm. Jannell,
BY Bates & Mocklin,
ATTORNEYS Patented Sept. 2, 1924.

1,507,381

UNITED STATES PATENT OFFICE.

WILLIAM JANNELL, OF WEST PARK, OHIO, ASSIGNOR TO THE DOMESTIC ELECTRIC COMPANY, OF CLEVELAND, OHIO, A CORPORATION OF OHIO.

COMMUTATOR-SLOTTING MACHINE.

Application filed December 3, 1920. Serial No. 428,073.

*To all whom it may concern:*

Be it known that I, WILLIAM JANNELL, a citizen of the United States, residing at West Park, in the county of Cuyahoga and State of Ohio, have invented a certain new and useful Improvement in Commutator-Slotting Machines, of which the following is a full, clear, and exact description, reference being had to the accompanying drawings.

This invention relates to a machine for slotting small articles, and is especially adapted for the slotting of commutator rings, particularly those used with the smaller sizes of electric motors.

An object of the invention is to provide such a machine whereby the slots may be rapidly and accurately cut in the plates of a commutator ring.

While my invention was evolved with relation to a cutter for commutator rings, the principles of operation involved are equally applicable to other machines and particularly to indexing machines of various kinds, in which an operation is to be repeatedly performed on a work piece at spaced intervals.

Figure 1:
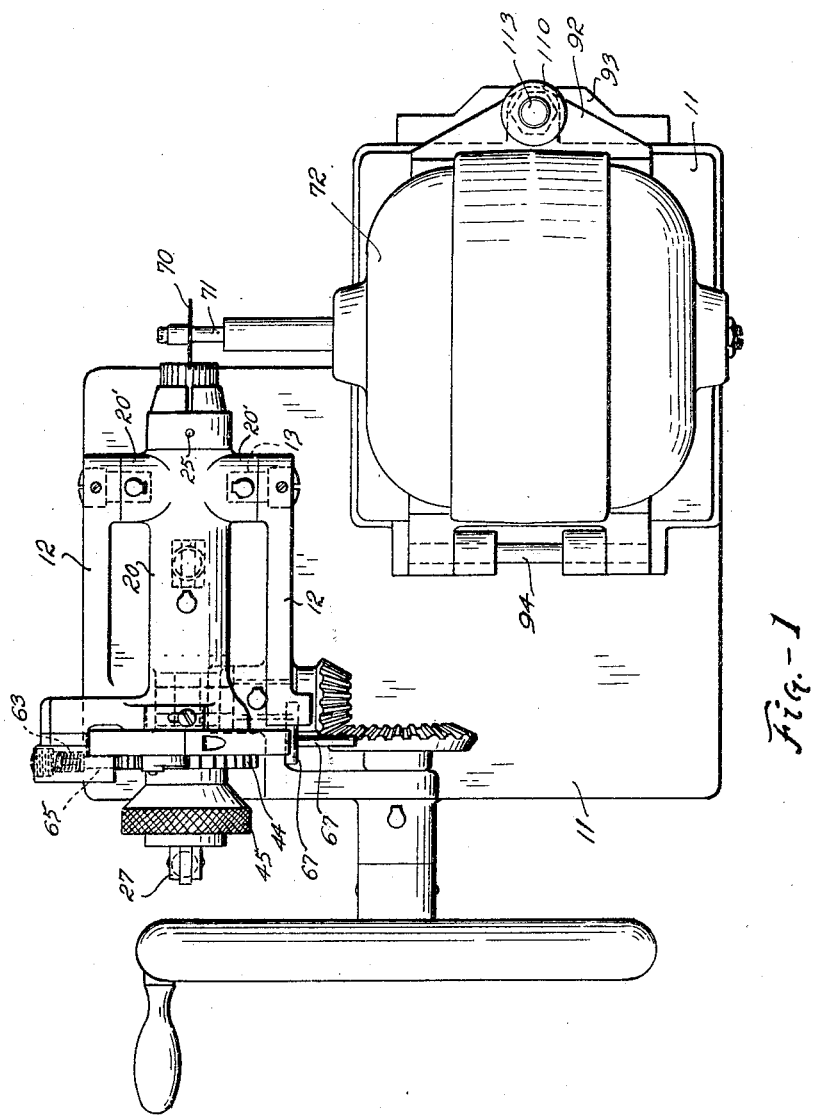
Figure 2:
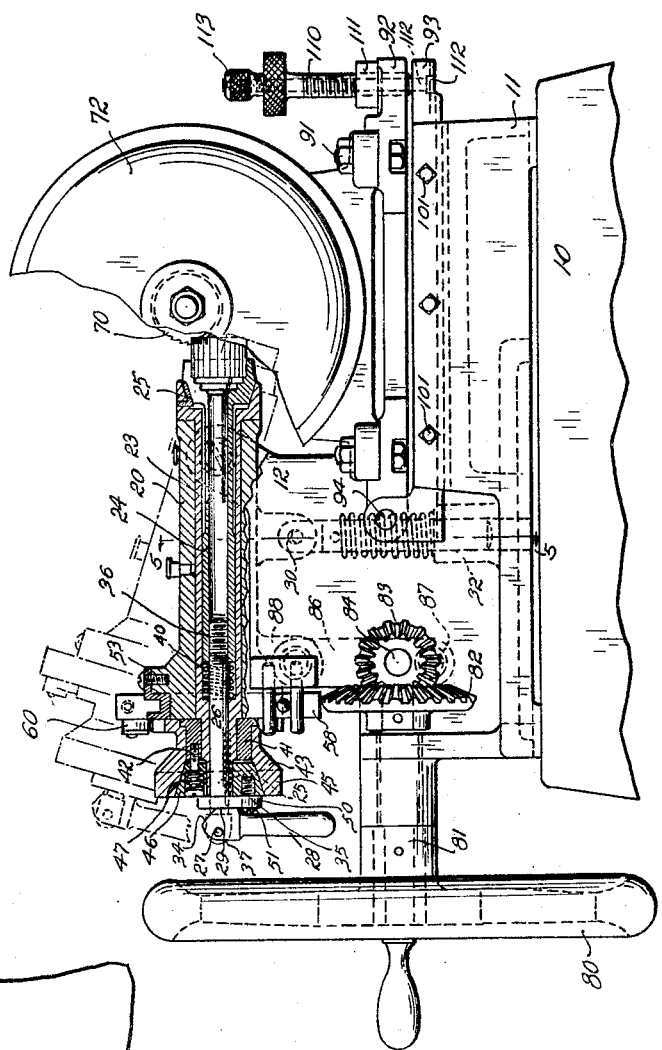
Figure 3:
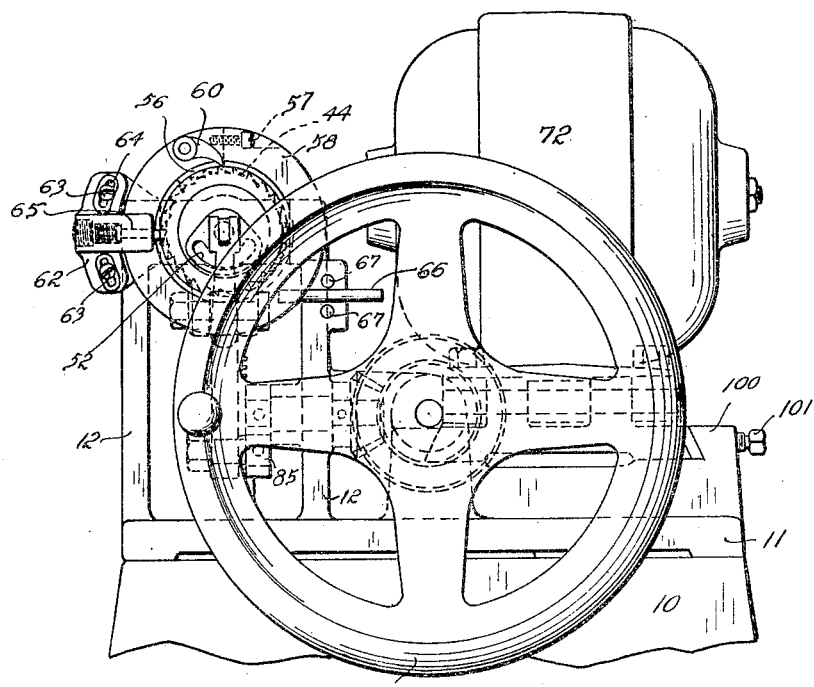
Figure 4:
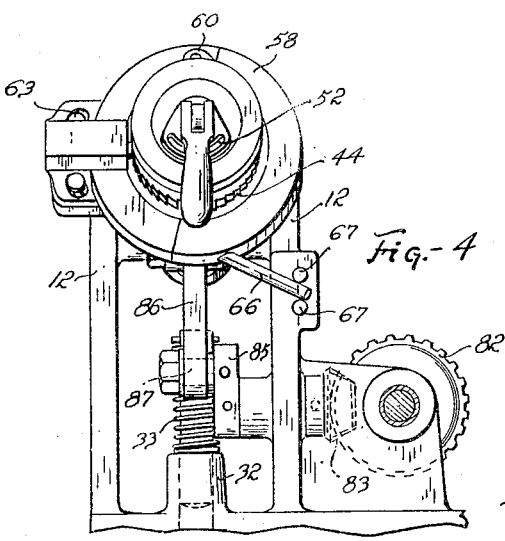
Figure 9:
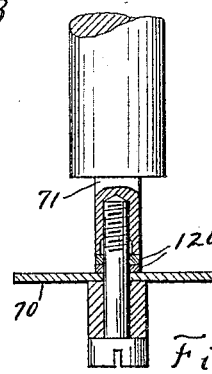

Referring to the drawings, which illustrate a commutator slotter specifically embodying my invention, Fig. 1 is a plan view of the machine; Fig. 2 is a side view with certain parts broken away and the work holder shown in section; Fig. 3 is an end view showing the chuck in operative position; Fig. 4 is a similar view with the chuck in inoperative position, the motor being broken away and the hand wheel being omitted; Fig. 5 is a cross section on an enlarged scale taken on the line 5—5 of Fig. 2, looking toward the left; Fig. 6 is a fragmentary view on an enlarged scale of one end of the chuck casing; Fig. 7 is a fragmentary section on an enlarged scale taken longitudinally of the chuck casing and illustrating the manner in which the chuck casing is pivoted; Fig. 8 is a fragmentary view of the rear end of the motor base, and Fig. 9 is a cross section taken through the end of the motor shaft showing the cutter mounting.

The machine shown, consists broadly of an operating tool herein shown as a rotating knife, a work holding means for moving the work into and out of operative relation with the tool, and operated to index the work while it is in inoperative position, whereby different portions of work are successively brought into operative relation with the tool.

Referring specifically to the drawings and the different parts by numerals, 10 represents a stand, supporting a frame 11 of the machine. A chuck carrier in the nature of a spindle 20 may be pivotally mounted by means of the bosses 20' which receive the trunnions 13 preferably threaded in the standards 12, which extend from the frame 11. The ends of the bosses 20' abut the members 12 to steady the motion of the carrier. Rotatably mounted within the carrier may be a chuck holder 23, which carries a split chuck or collet 24. The holder may operate in the usual manner to clamp the jaws of the collet in work holding position when the collet is drawn inwardly. In order to provide a means for operating the collet from the end of the casing opposite the jaws, a rod 26 is threaded as at 36 in the end of the chuck. This rod is feathered as shown at 35 in the holder 23, and the collet may be held against rotation relative to the holder 23 by means of a key 25 carried by the holder and projecting into a slot of the collet. A handle 28 is bifurcated at its upper end to receive an ear 37, extending from the end of the rod 26. Each of the bifurcated members may have cam surfaces 29 and 34, one of which is adapted to contact with the outer face of a plate 50, which plate has an opening through which the rod 26 passes.

As the face 34 is closer to the pivot point 27 than the face 29, the handle 28 may be turned to position to place face 29 in contact with the plate and thereby draw the jaws of the collet inward into clamping position, as shown in Fig. 2, or the handle may be raised to place face 34 opposite the plate and thereby allow the jaws to move into open position. A spring 40 bearing upon shoulders on the chuck holder and chuck, may serve to maintain the cam surface in contact with the plate.

A preferred means for indexing the chuck member, may comprise an outer clutch member 43 carrying a ratchet 44 and provided with a milled head 45 may be rotatably mounted upon a bushing 41, surrounding the reduced portion of the holder 23. A friction clutch connection for transmitting motion of the ratchet to the collet is preferred. This mechanism may consist of the conical clutch member 46 inserted in a conical recess in member 43, and connected to the bushing 41 by means of the screw 42 passing through an opening in member 46 and threaded in the bushing 41. A stiff spring 47 bears at one end upon the head of this screw and upon its other end on the member 46, whereby the clutch members are held in frictional connection, bushing 41 being shouldered to receive clutch member 43, whereby the pull of spring 47 serves to hold the clutch members in frictional engagement. The plate 50 is adapted to be adjustably attached to the clutch member 46 by means of the screw 51 passing thru the arcuate slot 52.

This friction clutch connection attains several results, serving to take up vibrations of the work during the cutting operation and also providing means whereby the position of the chuck may be adjusted so as to bring the slots in correct position on the commutator, the spring connection also prevents any tendency of parts to work loose, which would be caused by vibration if screw connections were employed for joining the different members.

The means for rotating the ratchet may comprise a pawl bearing ring 58, which is rotatably mounted upon a bushing 53, as is clearly seen in Fig. 6. This bushing may be adjustably mounted on the casing 20 by means of a set screw 55 passing thru an elongated slot 54 on the projecting portion 59 of the bushing. The portion of the bushing 53 which serves as a bearing for the pawl ring is U-shaped in cross section.

The ring 58 as shown consists of two sections which may be connected by suitable means, such as screws 57. Mounted on this ring may be a feed pawl 60, while an extension 56 of the bushing 53 overhangs the ratchet 44 and serves as a means to raise this pawl and thereby regulate the feed thereof. It will thus be seen that the ring 53 may be adjusted to vary the motion of the ratchet. Adjustably mounted on an arm 61 extending from casing 20 is the lock pawl casing 62, which is adjustable on said arm by means of the set screws 63 and the slots 64. Lock pawl 65 is held by means of springs 63′ in contact with ratchet 44 and serves to determine the position in which the ratchet shall be held. The feed pawl ring is adapted to be oscillated upon oscillation of the chuck carrier and to thereby rotate the chuck at each such oscillation. In order to bring this about the ring 58 is provided with the arm or pin 66, projecting therefrom and between the horizontally extending pins 67 carried by upright 12 of the frame 11.

It will be seen that when the carrier moves from the position of Fig. 3 to that of Fig. 4 the ring is rotated in a clockwise direction, and thereby feeds the ratchet. The member 56, however, is placed in such position as to prevent the turning of the ratchet until the work has been moved away from the rotating knife 70. The pawl then engages the ratchet and feeds the same until the casing reaches the position shown in Fig. 4, or dotted line position in Fig. 2. The pawl 60 is adapted to slightly overfeed the ratchet so that as the carrier recedes toward full line position in Fig. 2, the ratchet is moved slightly backward until the adjacent tooth is held by the lock pawl 65.

In order to oscillate the carrier 20 manually operable means have been provided, which may comprise hand wheel 80 pinned to the shaft 81, which is journaled on an upright standard on frame 11, and carries at one end the bevel gear 82 meshing with a bevel gear 83 mounted on one end of the shaft 84. This shaft is journaled in a box on one of the uprights 12 and carries at its other end the crank 85 connected to the lower end of link 86 by means of the crank pin 87, the upper end of said ring being pinned between the ears of casing 20. It will be seen that a single revolution of the wheel 80 will serve to move the carrier 20 from and bring it back to the position from which it started.

In order to cushion the oscillatory motion of the carrier, means are provided which are shown as comprising the ears 21, which receive between them the eye 30 of rod 31, which extends into an opening in a boss 32 formed on the frame 11. The compression spring 33, bearing at one end on the boss and at the other end upon a pin passing through the rod 31, forms a cushion connection for steadying the motion of the carrier while it is being moved. This spring also serves to take up the shocks and vibrations present during the cutting operation.

Suitable means may be provided for transmitting power to the knife and for adjusting it with relation to the collet. The means illustrated may comprise the motor 72, which is shown attached to the adjustable base 92 by means of bolts 91, which may project through elongated slots 90 in the upper section of the base 92. This provides for transverse adjustment relative to the collet, and a similar adjustment may also if desired be obtained by the use of shims 120 on the knife carrying spindle of the motor. A base supporting slide 93 is adjustably dove-tailed in the frame 11 and held in position by means of the set screws 101. This adjustment provides for varying the depth of the cut to be made in the commutator plate, since the dove-tailed slot extends longitudinally of carrier 20. Further adjustment of the knife is provided by the hinged relation between the members 92 and 93, by the hinged construction at 94, while adjacent the free ends of said members there is provided the hollow adjusting screw 110 threaded into the nut 111 passing through an opening in the member 92 and into contact with the face of the plate 93. Extending upward from the plate 93 is the screw clamp bolt 112 having its head countersunk in plate 93, and its body projecting upward thru the screw 110 and provided on its upper end with a threaded milled nut 113 which serves as a clamping means to hold the adjusting screw 110 in adjusted position. The screw means provides a delicate arcuate adjustment for the knife so as to nicely regulate the relation between the radial and axial depths of the cut to be made in the commutator ring.

The operation of the device is as follows:—

In order to place a commutator ring in the chuck, the chuck is moved to the dotted line position, seen in Fig. 2, the handle of cam 28 is then raised to allow the collet to be moved by spring 40 to open position, the operator places the work in the jaws and moves the handle back to the full line position seen in Fig. 2, whereby the work is grasped by the jaws of the collet. Rotation of the hand wheel 80 will now bring the collet back to horizontal position and the commutator ring into operative position with the knife, the spring 33 serving to cushion the motion of the carrier throughout and take up vibration when the work is in contact with the knife. After the cut has been made in the plate the operator rotates the wheel 80 one complete revolution. This throws the carrier 20 into the dotted line position and then brings it back, during this oscillation of the carrier 20, and while the work is out of cutting relation with the knife, the feed pawl 60 feeds the ratchet member 43, and by means of the friction clutch the collet is fed. As the carrier is returning from the dotted line position to the full line position, the ring backs up and tends to pull the ratchet with it, and thereby brings the adjacent tooth of the ratchet into contact with the lock pawl 65, whereby the ratchet and the collet are held in work indexing position as the work is again brought into contact with the knife. This operation of the hand wheel 80 is repeated until all the slots have been cut in the commutator ring. After this has taken place the operator stops the carrier in the dotted line position, shown in Fig. 2, and removes the commutator by operating the cam handle 28, and places a new commutator in position in the collet jaws, thereafter moving the jaws to work holding position by returning the handle 28 to its former position.

It will be seen that the friction clutch connection between the collet and ratchet provides a means for adjusting the indexing relation of these members, but that the adjustability of the locking pawl casing 62 also provides a ready means for making small adjustments to regulate the position of the slots on the commutator ring. The adjustability of the bushing 53, carrying pawl raiser 56 makes it possible to properly adjust the feed of the pawl 60. In the construction illustrated in the drawing the member 56 may be placed so as to cause pawl 60 to feed one, two or three teeth past the locking pawl on each oscillation of the carrier 20, so that a large range of adjustment of the feed is easily obtainable. The primary object of this member 56, however, is to prevent rotation of the collet until the work has been moved away from the knife.

While I have particularly described a machine, embodying the principles of my invention, it is apparent that these principles may be embodied in many other types of machines, particularly in indexing machines of various kinds, and it should be understood that my invention is not restricted to the form of device illustrated, and that the foregoing description is therefore illustrative and not restrictive.

Having thus described my invention, I claim:—

1. In a machine of the character described, a chuck, a chuck carrier, a ratchet associated therewith, a pawl movable thereon to turn the ratchet when the carrier is moved and means on the carrier adjustable to vary the consequent feed of the ratchet without affecting the feed of the pawl.

2. In a machine of the character described, a chuck carrier, mounted to be oscillated, a chuck carried thereby, an annular ratchet, a pawl for actuating the ratchet, the pawl being movable with the carrier, means for oscillating the pawl relative to the ratchet when the carrier is oscillated, and a pawl disengaging member mounted on the carrier and overlapping said ratchet and adjustable to determine the feed thereof.

3. In a machine of the character described, a pivotally mounted chuck carrier, a chuck carried thereby, a ratchet mounted on the carrier and independently rotatable, relative to the carrier, an adjustable bushing on the carrier, a pawl supporting member mounted on the bushing, a pawl mounted on said member in cooperative relation with the ratchet and a member carried by the bushing for raising the pawl during movement of the carrier whereby the feeding action of the ratchet upon the chuck may be interrupted during movement of the carrier.

4. In a machine of the character described, an oscillatory carrier, a gripping member rotatably mounted therein, and means operable by the oscillation of said casing to index said gripping member.

5. In a device of the class described, a pivotally mounted chuck carrier, a chuck rotatably mounted therein, means actuated by oscillatory motion of said casing to rotate said chuck and means for oscillating said casing.

6. In an indexing device, a frame, an oscillatory member thereon, a member rotatably carried by said oscillatory member, and means operated by the oscillatory motion of said first member to index said rotary member, comprising a pawl carrying ring and a pin projecting therefrom and extending between projections on said frame.

7. In a device of the character described, a rotating knife, a rotatably mounted chuck adapted to hold a part to be operated on adjacent said knife, movable means for supporting the chuck, a chuck indexing device including friction contacting members and adjustable means for disengaging the chuck from operative relation with said indexing device after a predetermined revolving movement of the chuck.

8. In a device of the character described, a rotating knife, a rotatably mounted chuck adapted to hold a part to be operated on adjacent said knife, a chuck carrier, means for moving the carrier to shift the chuck to and from operative position, an indexing device on the carrier for rotating the chuck, a predetermined angular amount and a friction contacting means for transmitting motion from the indexing device to the chuck carrier.

9. In a device of the class described, a rotating knife, a rotary and pivotally mounted chuck adapted to hold a piece to be cut in operative position with said knife, means for moving said chuck about said pivot away from said knife and adapted to rotate said chuck a predetermined amount and return it to operative position.

10. In a device of the class described, the combination of a pivoted chuck adapted to hold a commutator ring, a circular knife rotating in a plane radial of said ring, and means for moving said chuck into inoperative position and thereafter revolve it a predetermined amount and return it to operative position.

11. In a commutator slot cutter, the combination of a pivoted chuck adapted to hold a commutator ring, a circular knife rotating in a plane radial of said ring, and means for moving said chuck into inoperative position and thereafter revolving it a predetermined amount and return it to operative position, and adjusting means to regulate the amount of said revolution.

12. In a device of the class described, a chuck casing pivotally mounted on a transverse pivot, a rotary disk knife adapted to extend radially of said chuck and screw adjusting means for moving said kife in the radial plane.

13. In a commutator slotter, a machine bed, a rotary driven knife, and means whereby said knife is universally adjustable, said means comprising a motor frame, a motor base, a slide dovetailed in the bed and pivotally carrying the motor base, a knife carrying member comprising the motor shaft, means thereon for adjusting the knife longitudinally of the shaft, and means for adjusting said hinged member.

14. In a device of the class described, an indexing chuck, a ratchet for rotating said chuck, a friction clutch having one member attached to said chuck, and the other member comprising the ratchet, and means for periodically rotating said ratchet.

15. In a device of the class described, an oscillatory casing, a chuck rotatably carried thereon, means operable by the oscillation of said casing to rotate said chuck a predetermined amount, said means comprising a clutch member having ratchet teeth, and friction means between said clutch member and chuck.

16. In a device of the class described, a rotary disk knife, a chuck carrying casing adapted to oscillate about a pivot extending transversely of the plane of said kuife, means for resiliently holding said chuck in operative relation with said knife, and means for moving said chuck casing to inoperative position.

In testimony whereof, I hereunto affix signature.

WILLIAM JANNELL.